US 9,208,476 B2

(12) United States Patent
Vasters (10) Patent No.: US 9,208,476 B2
(45) Date of Patent: Dec. 8, 2015

(54) COUNTING AND RESETTING BROADCAST SYSTEM BADGE COUNTERS

(75) Inventor: Clemens Friedrich Vasters, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/278,313

(22) Filed: Oct. 21, 2011

(65) Prior Publication Data
US 2013/0067015 A1 Mar. 14, 2013

Related U.S. Application Data (60) Provisional application No. 61/533,653, filed on Sep. 12, 2011, provisional application No. 61/533,669, filed on Sep. 12, 2011.

(51) Int. Cl.
*G06F 15/16* (2006.01)
*G06Q 10/10* (2012.01)
*H04L 12/18* (2006.01)

(52) U.S. Cl.
CPC .......... *G06Q 10/107* (2013.01); *H04L 12/1881* (2013.01)

(58) Field of Classification Search
CPC . H04L 65/1016; H04L 51/22; H04L 65/1006; H04L 51/04; H04L 51/24; H04L 51/043; H04L 65/403; H04L 12/589; H04L 67/22; G06F 2201/88
USPC ........................................................ 709/207
See application file for complete search history.

(56) References Cited

U.S. PATENT DOCUMENTS

| 4,700,376 | A * | 10/1987 | Ohya et al. ........................ 379/77 |
| 6,298,378 | B1 | 10/2001 | Angal |
| 6,751,657 | B1 | 6/2004 | Zothner |
| 6,766,368 | B1 | 7/2004 | Jakobson |
| 7,062,272 | B2 | 6/2006 | Grilli et al. |

(Continued)

FOREIGN PATENT DOCUMENTS

| CN | 101164303 | 4/2008 |
| CN | 101831889 | 9/2010 |

(Continued)

OTHER PUBLICATIONS

Office Action dated Feb. 27, 2013 cited in U.S. Appl. No. 13/278,418.
(Continued)

*Primary Examiner* — Kevin Bates
*Assistant Examiner* — SM Rahman
(74) *Attorney, Agent, or Firm* — Bryan Webster; Leonard Smith; Micky Minhas (57) ABSTRACT

Providing a badge counter from a server to a consumer. The badge counter indicates a number of notifications. A method includes receiving an event in a sequence of events. The event has an associated time stamp. The method further includes associating with the event a plurality of additional time stamps from events in the sequence of events occurring before the event. The method further includes creating a notification for an end user consumer device, the notification including an indication of a badge counter value based on the plurality of additional time stamps. The method further includes sending the notification, including badge counter value to the consumer device.

20 Claims, 5 Drawing Sheets

(56) References Cited

U.S. PATENT DOCUMENTS

| | | |
|---|---|---|
| 7,209,955 B1 | 4/2007 | Major et al. |
| 7,243,156 B2 | 7/2007 | Hahn |
| 7,412,461 B2 | 8/2008 | Sholl |
| 7,509,304 B1 | 3/2009 | Pather et al. |
| 7,516,208 B1 | 4/2009 | Kerrison |
| 7,613,721 B2 | 11/2009 | Horvitz et al. |
| 7,617,160 B1 | 11/2009 | Grove et al. |
| 7,617,162 B2 | 11/2009 | Saini |
| 7,676,812 B2 | 3/2010 | Cabrera |
| 7,743,137 B2 | 6/2010 | Sarwono et al. |
| 7,765,281 B1 | 7/2010 | Crow |
| 7,774,792 B2 | 8/2010 | Anderson et al. |
| 7,797,306 B1 | 9/2010 | Pather |
| 7,817,544 B2 | 10/2010 | Zhu |
| 8,001,232 B1 | 8/2011 | Saulpaugh et al. |
| 8,428,227 B2 | 4/2013 | Angel et al. |
| 2001/0038639 A1 | 11/2001 | McKinnon et al. |
| 2001/0038640 A1 | 11/2001 | McKinnon, III et al. |
| 2002/0129141 A1* | 9/2002 | Sogabe et al. ............... 709/224 |
| 2003/0191856 A1 | 10/2003 | Lewis et al. |
| 2004/0025014 A1 | 2/2004 | Kaler |
| 2004/0064387 A1 | 4/2004 | Clarke |
| 2004/0177156 A1 | 9/2004 | Hahn et al. |
| 2004/0203644 A1 | 10/2004 | Anders |
| 2004/0254993 A1* | 12/2004 | Mamas ......................... 709/206 |
| 2005/0220064 A1 | 10/2005 | Hundscheidt et al. |
| 2005/0278416 A1 | 12/2005 | Kay |
| 2006/0130046 A1 | 6/2006 | Oneill |
| 2006/0153616 A1 | 7/2006 | Hofmann |
| 2006/0177058 A1 | 8/2006 | Sarwono et al. |
| 2006/0224772 A1 | 10/2006 | Saccocio |
| 2006/0235715 A1 | 10/2006 | Abrams et al. |
| 2007/0094251 A1 | 4/2007 | Lu et al. |
| 2007/0112635 A1 | 5/2007 | Loncaric |
| 2007/0112714 A1 | 5/2007 | Fairweather |
| 2007/0180119 A1 | 8/2007 | Khivesara et al. |
| 2007/0208759 A1 | 9/2007 | Von Koch |
| 2007/0220558 A1 | 9/2007 | Jung et al. |
| 2007/0230920 A1 | 10/2007 | Gasper |
| 2007/0260674 A1 | 11/2007 | Shenfield |
| 2008/0063154 A1 | 3/2008 | Tamari |
| 2008/0077561 A1* | 3/2008 | Yomtobian ..................... 707/3 |
| 2008/0120432 A1 | 5/2008 | Lamoureux et al. |
| 2008/0133395 A1 | 6/2008 | Jiminez et al. |
| 2008/0201484 A1 | 8/2008 | Sano et al. |
| 2008/0285542 A1 | 11/2008 | Jachner |
| 2008/0301061 A1 | 12/2008 | Kittelsen |
| 2008/0306970 A1 | 12/2008 | Gilman |
| 2008/0306984 A1 | 12/2008 | Friedlander et al. |
| 2009/0070228 A1* | 3/2009 | Ronen ............................ 705/26 |
| 2009/0132684 A1 | 5/2009 | Pelley et al. |
| 2009/0204706 A1 | 8/2009 | Ertugrul et al. |
| 2009/0264102 A1 | 10/2009 | Parmar |
| 2010/0042519 A1 | 2/2010 | Dingler et al. |
| 2010/0083124 A1 | 4/2010 | Druzgalski et al. |
| 2010/0095242 A1 | 4/2010 | Freeny, Jr. |
| 2010/0114857 A1 | 5/2010 | Edwards et al. |
| 2010/0227632 A1 | 9/2010 | Bell et al. |
| 2010/0287295 A1 | 11/2010 | Schaffa et al. |
| 2011/0029598 A1* | 2/2011 | Arnold et al. ................. 709/203 |
| 2011/0125753 A1 | 5/2011 | Dow et al. |
| 2011/0153349 A1 | 6/2011 | Anderson et al. |
| 2011/0161167 A1 | 6/2011 | Jallapuram |
| 2011/0161987 A1* | 6/2011 | Huang et al. .................. 719/318 |
| 2011/0167357 A1 | 7/2011 | Benjamin et al. |
| 2011/0173522 A1* | 7/2011 | Gupta ........................... 715/205 |
| 2011/0231256 A1* | 9/2011 | Wang et al. ................. 705/14.53 |
| 2011/0282949 A1 | 11/2011 | Rivkin |
| 2011/0321062 A1 | 12/2011 | Pope et al. |
| 2012/0005025 A1 | 1/2012 | Aaltonen et al. |
| 2013/0054706 A1* | 2/2013 | Graham et al. ................ 709/206 |
| 2013/0067025 A1 | 3/2013 | Vasters |

FOREIGN PATENT DOCUMENTS

| | | |
|---|---|---|
| CN | 102147903 | 8/2011 |
| JP | 2004326480 | 11/2004 |
| JP | 2009265703 | 11/2009 |
| KR | 10-2009-001946 | 2/2009 |
| KR | 10-2011-0071828 | 6/2011 |

OTHER PUBLICATIONS

U.S. Appl. No. 13/278,401, filed Oct. 21, 2011, Vasters.
U.S. Appl. No. 13/278,408, filed Oct. 21, 2011, Vasters.
U.S. Appl. No. 13/278,415, filed Oct. 21, 2011, Vasters.
U.S. Appl. No. 13/278,418, filed Oct. 21, 2011, Vasters.
U.S. Appl. No. 13/278,422, filed Oct. 21, 2011, Vasters.
"Introduction to Data Warehousing", Retrieved on Sep. 19, 2011, Available at: http://dataminingtools.net/wiki/introdw.php.
Al-Shaer, Ehab Salem, "A Hierarchical Filtering-based Monitoring Architecture for Large-Scale Distributed Systems", A Dissertation Submitted to the Faculty of Old Dominion University and Partial Fulfillment of the Requirements for the Degree of Doctor of Philosophy, Computer Science, Dec. 1998, 223 pages.
Patel, Jay A., "Exploiting System Diversity in Peer-to-Peer Publish-Subscribe Systems", Dissertation, Submitted in Partial Fulfillment of the Requirements for the Degree of Doctor of Philosophy in Computer Science in the Graduate College of the University of Illinois, May 2009, 124 pages.
"Amazon Simple Notification Service (Amazon SNS)", Retrieved on: Sep. 19, 2011, Available at: http://aws.amazon.com/sns/.
Yoon et al., "On-demand Replication for Failover in Content-based Publish/Subscribe Overlays", In Middleware Systems Research Group Technical Report, Nov. 2009, pp. 1-12.
Vasters, Clemens, "Introducing the Windows Azure AppFabric Service Bus May 2011 CTP", Published on : May 16, 2011, Available at: http://vasters.com/clemensv/2011/05/16/Introducing+The+Windows+Azure+AppFabric+Service+Bus+May+2011+CTP.aspx.
Chou, David, "Using Events in Highly Distributed Architectures", In Journal of Microsoft Architecture, Oct. 2008, 10 pages.
"Yahoo! Sportacular", Retrieved on: Sep. 22, 2011, Available at: http://mobile.yahoo.com/spoets/iphone.
"Windows Phone 7 Development: Push Notifications—Implementing Toast Notifications", Published on: May 17, 2011, Available at: http://programming4.us/mobile/3696.aspx.
Podnar, et al., "Mobile Push: Delivering Content to Mobile Users", In Proceedings of 22nd International Conference on Distributed Computing Systems Workshops, 2002, pp. 563-568.
Thawani, et al., "Context-aware Timely Information Delivery in Mobile Environments", In Proceedings of the Computer Journal, vol. 50, Issue 4, Mar. 13, 2007, pp. 460-472.
Aalto, et al., "Bluetooth and WAP Push Based Location-Aware Mobile Advertising System", In Proceedings of 2nd International Conference on Mobile Systems, Applications, and Services, Jun. 6-9, 2004, pp. 49-58.
"The Data Distribution Service-reducing Cost through Agile Integration", Published on: 2011, Available at least as early as Sep. 23, 2011 at: http://www.ucsarchitecture.org/downloads/DDS%20Exec%20Brief%20v20l-public.pdf.
Roganovic, et al., "A Real-time Traffic Information Service for Efficient Navigation and Transport Management", In Proceedings of AGILE, Apr. 18-22, 2011, 4 pages.
"Customized Notifications", Retrieved on: Sep. 19, 2011, 8 pages, Available at: http://www.ilient.com/Sysforums/templates/default/help/files/CustomNotifications.htm.
Fiege, et al., "Modular Event-Based Systems", In Journal of the Knowledge Engineering Review, vol. 17, Issue 4, Dec. 2002, 43 pages.
Fiege, et al., "Engineering Event-Based Systems with Scopes", In Proceedings of the 16th European Conference on Object-Oriented Programming, vol. 2374, Jun. 2002, pp. 309-333.
Brennan, Patrick, "Adding Push Notifications to your App: Build or Buy?", Retrieved on: Sep. 16, 2011, Available at: http://blog.w3i.com/2011/09/13/adding-push-notifications-to-your-app-build-or-buy/.

(56) References Cited

OTHER PUBLICATIONS

"Apple Push Notification Service", Retrieved on: Sep. 16, 2011, Available at: http://en.wikipedia.org/wiki/Apple_Push_Notification_Service.
Kiriaty,Yochay, "Understanding Microsoft Push Notifications for Windows Phones", Retrieved on: Sep. 16, 2011, Available at: http://windowsteamblog.com/windows_phone/b/wpdev/archive/2010/05/03/understanding-microsoft-push-notifications-or-windows-phones.aspx.
Notice of Allowance dated Aug. 20, 2013 cited in U.S. Appl. No. 13/278,427.
Office Action dated May 8, 2013 cited in U.S. Appl. No. 13/278,401.
Office Action dated May 16, 2013 cited in U.S. Appl. No. 13/278,422.
Chen, et al., "An Efficient Spatial Publish/Subscribe System for Intelligent Location-Based Services", In Proceedings of 2nd International Workshop on Distributed Event-based Systems, Jun. 8, 2003, pp. 1-6.
Hoffert, et al., "Evaluating Transport Protocols for Real-Time Event Stream Processing Middleware and Applications", In Proceedings of the Confederated International Conferences, CoopIS, DOA, IS, and ODBASE on on the Move to Meaningful Internet Systems, Part I, Nov. 1-6, 2009, pp. 614-633.
Huang, et al., Publish/Subscribe in a Mobile Environment, In Journal of Wireless Networks—Special Issue: Pervasive Computing and Communications, vol. 10, Issue 6, Nov. 2004, pp. 643-652.
Office Action dated Mar. 29, 2013 cited in U.S. Appl. No. 13/278,408.
Office Action dated Apr. 17, 2013 cited in U.S. Appl. No. 13/278,415.
Office Action dated Jun. 27, 2013 cited in U.S. Appl. No. 13/278,427.
Office Action dated Feb. 28, 2014 cited in U.S. Appl. No. 13/278,401.
Office Action dated Oct. 18, 2013 cited in U.S. Appl. No. 13/278,422.
Office Action dated Nov. 21, 2013 cited in U.S. Appl. No. 13/278,418.
Notice of Allowance dated Dec. 4, 2013 cited in U.S. Appl. No. 13/278,408.
Office Action dated Dec. 30, 2013 cited in U.S. Appl. No. 13/278,415.
Office Action dated Oct. 20, 2014 cited in U.S. Appl. No. 13/278,418.
Office Action dated Dec. 22, 2014 cited in U.S. Appl. No. 13/278,415.
First Office Action and Search Report Issued in Chinese Patent Application No. 201210335115.7, Mailed Date: Nov. 27, 2014, 11 Pages.
First Office Action and Search Report Received for Chinese Patent Application No. 201210335131.6, Mailed Date: Jan. 12, 2015, 11 Pages.
"Excerpt. Chapter 11: Routing Slip ED—Hohpe Gregor; Woolf Bobby", Jan. 2004, Enterprise Integration Patterns: Designing, Building, and Deploying Messaging Solutions.
"Enterprise Integration Patterns—Recipient List", Jan. 2004, Available at <<http://www.enterpriseintegrationpatterns.com/RecipientList.html>>.
Supplementary Search Report issued in European Patent Application No. 12830940.8, Mailed Date: Mar. 25, 2015, 6 Pages.
First Office Action Issued in Chinese Patent Application No. 201210335057.8, Mailed Date: Apr. 29, 2015, 12 Pages.
Office Action dated Apr. 2, 2015 cited in U.S. Appl. No. 13/278,401.
Supplementary Search Report Issued in European Patent Application No. 12832240.1, Mailed Date: Jun. 3, 2015, 5 Pages.
Office Action dated Jul. 1, 2015 cited in U.S. Appl. No. 13/278,415.
Office Action dated Jul. 17, 2015 cited in U.S. Appl. No. 13/278,418.
Second Office Action Received for Chinese Patent Application No. 201210335115.7, Mailed Date: Aug. 17, 2015, 8 Pages.

\* cited by examiner

Figure 5

# COUNTING AND RESETTING BROADCAST SYSTEM BADGE COUNTERS

CROSS-REFERENCE TO RELATED APPLICATIONS

This application claims the benefit of U.S. Provisional application 61/533,653 filed Sep. 12, 2011, titled "MECHANISM TO COUNT AND RESET BADGE COUNTERS IN A BROADCAST SYSTEM" and U.S. Provisional application 61/533,669 filed Sep. 12, 2011, titled "SYSTEM TO DISTRIBUTE MOBILE PUSH NOTIFICATIONS SOURCED FROM A VARIETY OF EVENT SOURCES TARGETS WITH CUSTOMIZED MAPPING OF EVENT DATA TO NOTIFICATIONS" which are incorporated herein by reference in their entirety.

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing system.

Many computers are intended to be used by direct user interaction with the computer. As such, computers have input hardware and software user interfaces to facilitate user interaction. For example, a modern general purpose computer may include a keyboard, mouse, touchpad, camera, etc for allowing a user to input data into the computer. In addition, various software user interfaces may be available.

Examples of software user interfaces include graphical user interfaces, text command line based user interface, function key or hot key user interfaces, and the like.

Mobile Push Notification systems like the ones provided by Apple Inc. for iOS (APNs) or by Microsoft Corp. for Windows Phone (MPNS) are allowing servers sending notifications to include so-called 'badge counters' that cause a visual indication on the phone's UI representing a (numerical) counter value. The phone platforms are intentionally leaving it open how to interpret that value, but it's commonly used to indicate facts like how many messages have arrived that the user has not yet read. However, more accurately, the badge counter may reflect the number of messages received since a user has last opened or interacted with an application. For example, a user may receive a number of emails where each email is sent with a badge counter value that increments with each email sent. The user may then open an email application, and not actually read any of the emails, but this nonetheless causes a message to be sent to a server sending the emails to the user indicating that the user has looked at the emails. The server will reset the badge counter based on this message. Subsequent emails sent from the server will include a badge counter incremented from the reset.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein is directed to a method of providing a badge counter from a server to a consumer. The badge counter indicates a number of notifications. The method includes receiving an event in a sequence of events. The event has an associated time stamp. The method further includes associating with the event a plurality of additional time stamps from events in the sequence of events occurring before the event. The method further includes creating a notification for an end user consumer device, the notification including an indication of a badge counter value based on the plurality of additional time stamps. The method further includes sending the notification, including badge counter value to the consumer device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Badge counter values are typically supplied by the server, but commonly reflect a private state condition related to the user of the application and their particular consumption of notifications and the application to which the events relate. These counters can pose a particularly difficult challenge in broadcast systems that fan out a single event (such as a sports score or stock quote) to thousands or even millions of targets and can't afford, for scalability and throughput reasons, to track each user's current counter using a database update. If the server had to track each user's current counter, then nearly all of the benefit of fanning out a common message to multiple users is eliminated as individual state needs to be maintained for each of the users.

Some embodiments described allow individual counters to be tracked in an event broadcast system without requiring individual tracking of counters for each end user. This may be accomplished by a server receiving a series of events, where each event in the series is associated with a list of time stamps. The list of time stamps for each event includes a time stamp for the event and time stamps for all previous events in the series.

A user sends a time-stamp to the server. The time stamp is an indicator of when the user performed some user interaction at a user device. For example, the time stamp may be an indication of when the user opened an application on a user device. The server compares the time stamp sent by the user to a list of time stamps for an event that is about to be sent to a user. The server counts the number of time stamps in the list of time stamps for the event that is about to be sent to the user occurring after the user sent time stamp, and sends this count as the badge counter.

Figure 1:
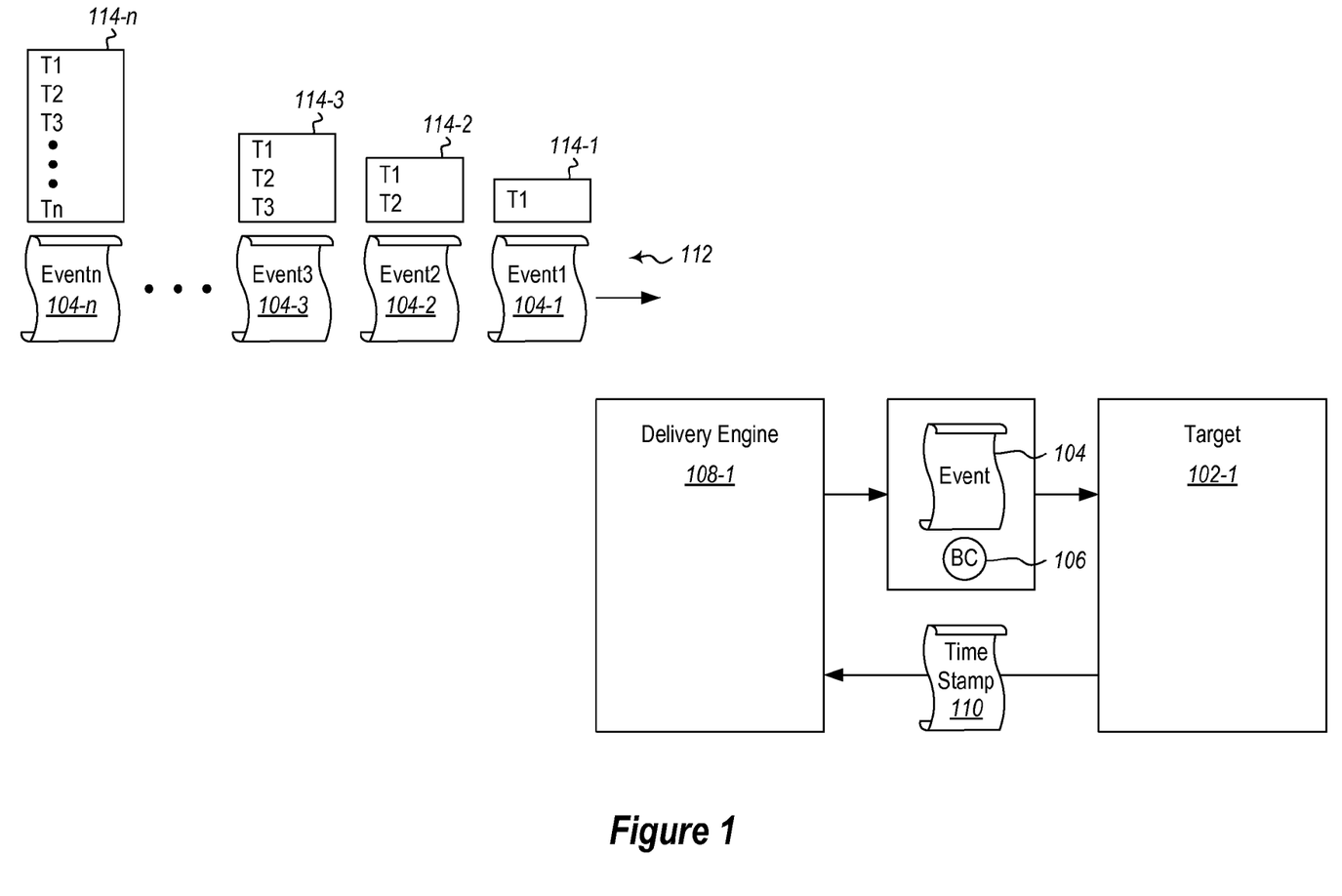
FIG. 1 illustrates an implementation of badge counter functionality.

An example is illustrated in FIG. 1 attached hereto. FIG. 1 illustrates a target 102-1. The target 102-1 receives events 104 and badge counters 106 from a delivery engine 108-1. The target 102-1 sends time stamps 110 to the delivery engine 108-1. The time stamps 110 sent by the target 102-1 to the delivery engine 108-1 may be based on some action at the target 102-1. For example, a user may open an application associated with the events 104 and badge counters 106 sent by the delivery engine 108-1 to the target 102-1. Opening an application may cause a time stamp 110 to be emitted from the target 102-1 to the delivery engine 108-1 indicating when the application was opened.

The delivery engine 108-1 receives a series 112 of events (illustrated as 104-1, 104-2, 104-3, and 104-n). Each of the events in the series 112 of events is associated with a list 114-1, 114-2, 114-3, or 114-n respectively of timestamps. Each list of time stamps includes a timestamp for the current event, and a timestamp for each event in the series prior to the current event. In the illustrated example, the event 104-1 is the first event sent to the delivery engine 108-1 for delivery to targets. Thus, the list 114-1 associated with the event 104-1 includes a single entry T1 corresponding to a time when the event 104-1 was sent to the delivery engine 108-1. The event 104-2 is sent to the delivery engine 108-1 after the event 104-1 and thus is associated with a list 114-2 that includes time stamps T1 and T2 corresponding to when events 104-1 and 104-2 were sent to the delivery engine 108-1 respectively. The event 104-3 is sent to the delivery engine 108-1 after the event 104-2 and thus is associated with a list 114-3 that includes time stamps T1, T2 and T3 corresponding to when events 104-1, 104-2 and 104-3 were sent to the delivery engine 108-1 respectively. The event 104-n is sent to the delivery engine 108-1 after the event 104-3 (and presumably a number of other events as indicated by the ellipses in the list 114-n) and thus is associated with a list 114-n that includes time stamps T1, T2, T3 through Tn corresponding to when events 104-1, 104-2, 104-3 through 104-n were sent to the delivery engine 108-1 respectively.

Assume that the target 102-1 has not sent any timestamps 110 to the delivery engine 108-1. When the delivery engine sends the event 104-1, it will also send a badge counter with a value of 1, corresponding to T1. When the delivery engine sends the event 104-2, it will also send a badge counter with a value of 2, corresponding to the count of two time stamps T1 and T2. When the delivery engine sends the event 104-3, it will also send a badge counter with a value of 3, corresponding to three time stamps T1, T2 and T3. When the delivery engine sends the event 104-n, it will also send a badge counter with a value of n, corresponding to n time stamps, T1 through Tn.

Now assume that the target sends a time stamp 110 with an absolute time that occurs between time T2 and T3. Presumably at this point, events 104-1 and 104-2 have already been delivered to the target 102-1. When event 104-3 is sent to the target, the delivery engine 108-1 only counts time stamps occurring after the time stamp 110 when determining the value of the badge counter. Thus, in this scenario, the delivery engine 108-1 sends a badge counter of 1 corresponding to T3 (as events T1 and T2 occurred before the time stamp 110) along with the event 104-3. This process can be repeated with the most recent time stamp 110 received from the target 102-1 being used to determine the badge counter value.

As intimated previously, embodiments may be particularly useful in a message fan-out system where a single event is fanned out to a plurality (and potentially large number) of end users. Such an example is illustrated in FIG. 2.

Figure 2:
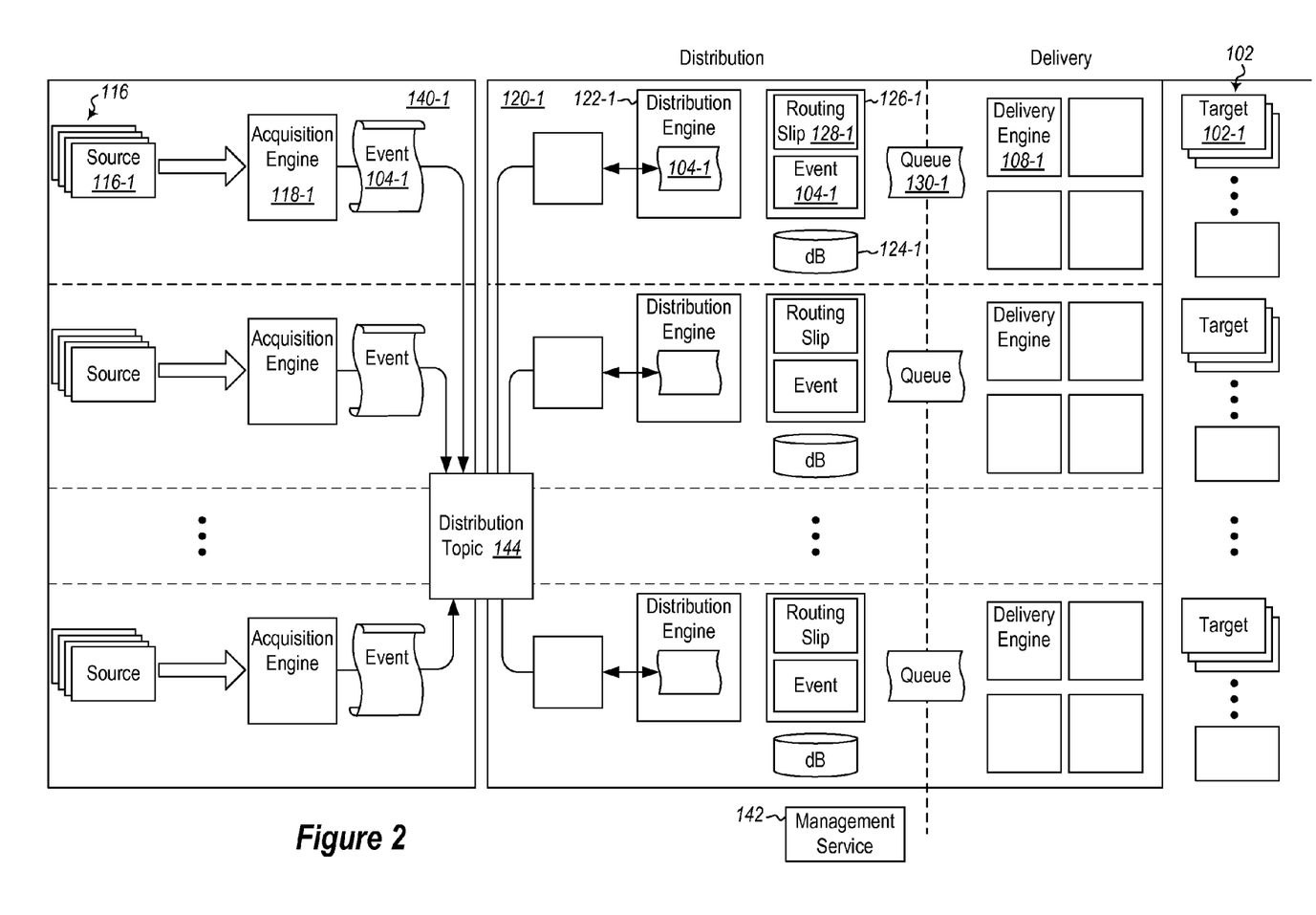
FIG. 2 illustrates an event data acquisition and distribution system.

FIG. 2 illustrates an example where information from a large number of different sources is delivered to a large number of different targets. In some examples, information from a single source, or information aggregated from multiple sources, may be used to create a single event that is delivered to a large number of the targets. This may be accomplished, in some embodiments, using a fan-out topology as illustrated in FIG. 2 attached hereto.

FIG. 2 illustrates the sources 116. As will be discussed later herein, embodiments may utilize acquisition partitions 140. Each of the acquisition partitions 140 may include a number of sources 116. There may be potentially a large number and a diversity of sources 116. The sources 116 provide information. Such information may include, for example but not limited to, email, text messages, real-time stock quotes, real-time sports scores, news updates, etc.

FIG. 2 illustrates that each partition includes an acquisition engine, such as the illustrative acquisition engine 118. The acquisition engine 118 collects information from the sources 116, and based on the information, generates events. In the example illustrated in FIG. 2, a number of events are illustrated as being generated by acquisition engines using various sources. An event 104-1 is used for illustration. In some embodiments, the event 104-1 may be normalized as explained further herein. The acquisition engine 118 may be a service on a network, such as the Internet, that collects information from sources 116 on the network.

FIG. 2 illustrates that the event 104-1 is sent to a distribution topic 144. The distribution topic 144 fans out the events to a number of distribution partitions. Distribution partition 120-1 is used as an analog for all of the distribution partitions. The distribution partitions each service a number of end users or devices represented by subscriptions. The number of subscriptions serviced by a distribution partition may vary from that of other distribution partitions. In some embodiments, the number of subscriptions serviced by a partition may be dependent on the capacity of the distribution partition. Alternatively or additionally, a distribution partition may be selected to service users based on logical or geographical proximity to end users. This may allow alerts to be delivered to end users in a more timely fashion.

In the illustrated example, distribution partition 120-1 includes a distribution engine 122-1. The distribution engine 122-1 consults a database 124-1. The database 124-1 includes information about subscriptions with details about the associated delivery targets 102. In particular, the database may include information such as information describing platforms for the targets 102, applications used by the targets 102, network addresses for the targets 102, user preferences of end users using the targets 102, etc. Using the information in the database 124-1, the distribution engine 122-1 constructs a bundle 126-1, where the bundle 126-1 includes the event 104 (or at least information from the event 104) and a routing slip 128-1 identifying a plurality of targets 102 from among the targets 102 to which information from the event 104-1 will be sent as a notification. The bundle 126-1 is then placed in a queue 130-1.

The distribution partition 120-1 may include a number of delivery engines. The delivery engines dequeue bundles from the queue 103-1 and deliver notifications to targets 102. For example, a delivery engine 108-1 can take the bundle 126-1 from the queue 13-1 and send the event 104 information to the targets 102 identified in the routing slip 128-1. Thus, notifications 134 including event 104-1 information can be sent from the various distribution partitions to targets 102 in a number of different formats appropriate for the different targets 102 and specific to individual targets 102. This allows individualized notifications 134, individualized for individual targets 102, to be created from a common event 104-1 at the edge of a delivery system rather than carrying large numbers of individualized notifications through the delivery system.

The following illustrates alternative descriptions of information collection and event distribution systems that may be used in some embodiments.

As a foundation, one embodiment system is using a publish/subscribe infrastructure as provided by Windows Azure Service Bus available from Microsoft Corporation of Redmond Wash., but which also exists in similar form in various other messaging systems. The infrastructure provides two capabilities that facilitate the described implementation of the presented method: Topics and Queues.

A Queue is a storage structure for messages that allows messages to be added (enqueued) in sequential order and to be removed (dequeued) in the same order as they have been added. Messages can be added and removed by any number of concurrent clients, allowing for leveling of load on the enqueue side and balancing of processing load across receivers on the dequeue side. The queue also allows entities to obtain a lock on a message as it is dequeued, allowing the consuming client explicit control over when the message is actually deleted from the queue or whether it may be restored into the queue in case the processing of the retrieved message fails.

A Topic is a storage structure that has all the characteristics of a Queue, but allows for multiple, concurrently existing 'subscriptions' which each allow an isolated, filtered view over the sequence of enqueued messages. Each subscription on a Topic yields a copy of each enqueued message provided that the subscription's associated filter condition(s) positively match the message. As a result, a message enqueued into a Topic with 10 subscriptions where each subscription has a simple 'passthrough' condition matching all messages, will yield a total of 10 messages, one for each subscription. A subscription can, like a Queue, have multiple concurrent consumers providing balancing of processing load across receivers.

Another foundational concept is that of 'event', which is, in terms of the underlying publish/subscribe infrastructure just a message. In the context of one embodiment, the event is subject to a set of simple constraints governing the use of the message body and message properties. The message body of an event generally flows as an opaque data block and any event data considered by one embodiment generally flows in message properties, which is a set of key/value pairs that is part of the message representing the event.

Figure 3:
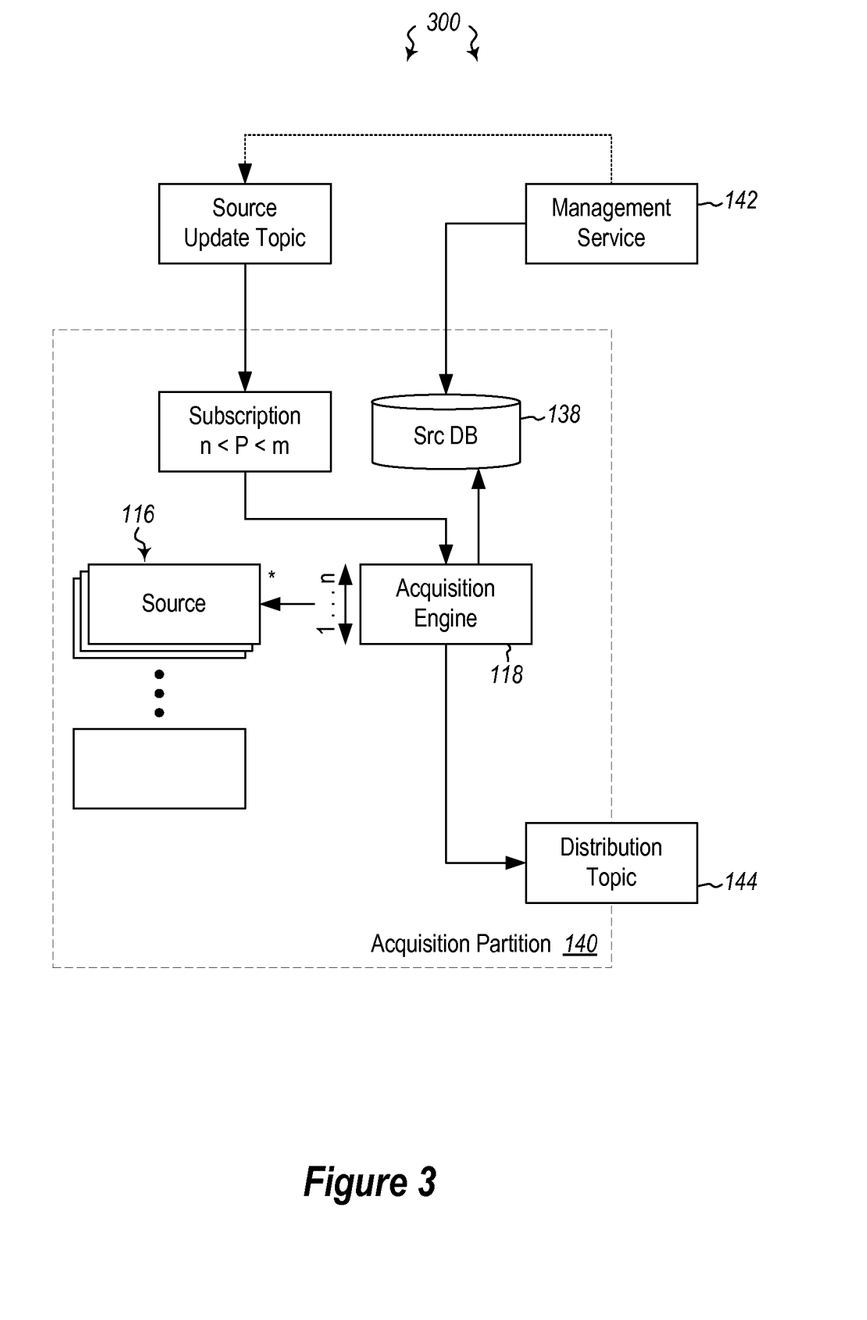
FIG. 3 illustrates an example of an event data acquisition system.

Referring now to FIG. 3, one embodiment architecture's goal is to acquire event data from a broad variety of different sources 116 at large scale and forward these events into a publish/subscribe infrastructure for further processing. The processing may include some form of analysis, real time search, or redistribution of events to interested subscribers through pull or push notification mechanisms.

One embodiment architecture defines an acquisition engine 118, a model for acquisition adapters and event normalization, a partitioned store 138 for holding metadata about acquisition sources 116, a common partitioning and scheduling model, and a model for how to flow user-initiated changes of the state of acquisition sources 116 into the system at runtime and without requiring further database lookups.

In a concrete implementation, the acquisition may support concrete acquisition adapters to source events from a broad variety of public and private networked services, including RSS, Atom, and OData feeds, email mailboxes including but not limited to such supporting the IMAP and POP3 protocols, social network information sources 116 like Twitter timelines or Facebook walls, and subscriptions on external publish/subscribe infrastructures like Windows Azure Service Bus or Amazon's Simple Queue Service.

Event Normalization

Event data is normalized to make events practically consumable by subscribers on a publish/subscribe infrastructure that they are being handed off to. Normalization means, in this context, that the events are mapped onto a common event model with a consistent representation of information items that may be of interest to a broad set of subscribers in a variety of contexts. The chosen model here is a simple representation of an event in form of a flat list of key/value pairs that can be accompanied by a single, opaque, binary chunk of data not further interpreted by the system. This representation of an event is easily representable on most publish/subscribe infrastructures and also maps very cleanly to common Internet protocols such as HTTP.

To illustrate the event normalization, consider the mapping of an RSS or Atom feed entry into an event 104 (see FIGS. 1 and 2). RSS and Atom are two Internet standards that are very broadly used to publish news and other current information, often in chronological order, and that aids in making that information available for processing in computer programs in a structured fashion. RSS and Atom share a very similar structure and a set of differently named but semantically identical data elements. So a first normalization step is to define common names as keys for such semantically identical elements that are defined in both standards, like a title or a synopsis. Secondly, data that only occurs in one but not in the other standard is usually mapped with the respective 'native' name. Beyond that, these kinds of feeds often carry 'extensions', which are data items that are not defined in the core standard, but are using extensibility facilities in the respective standards to add additional data.

Some of these extensions, including but not limited to GeoRSS for geolocation or OData for embedding structured data into Atom feeds are mapped in a common way that is shared across different event sources 116, so that the subscriber on the publish/subscribe infrastructure that the events are emitted to can interpret geolocation information in a uniform fashion irrespective of whether the data has been acquired from RSS or Atom or a Twitter timeline. Continuing with the GeoRSS example, a simple GeoRSS expression representing a geography 'point' can thus be mapped to a pair of numeric 'Latitude'/'Longitude' properties representing WGS84 coordinates.

Extensions that carry complex, structured data such as OData may implement a mapping model that preserves the complex type structure and data without complicating the foundational event model. Some embodiments normalize to a canonical and compact complex data representation like JSON and map a complex data property, for instance an OData property 'Tenant' of a complex data type 'Person' to a key/value pair where the key is the property name 'Tenant' and the value is the complex data describing the person with name, biography information, and address information represented in a JSON serialized form. If the data source is an XML document, as it is in the case of RSS or Atom, the value may be created by transcribing the XML data into JSON preserving the structure provided by XML, but flattening out XML particularities like attributes and element, meaning that both XML attributes and elements that are subordinates of the same XML element node are mapped to JSON properties as 'siblings' with no further differentiation.

Sources and Partitioning

One embodiment architecture captures metadata about data sources 116 in 'source description' records, which may be stored in the source database 138. A 'source description' may have a set of common elements and a set of elements specific to a data source. Common elements may include the source's name, a time span interval during which the source 116 is considered valid, a human readable description, and the type of the source 116 for differentiation. Source specific elements depend on the type of the source 116 and may include a network address, credentials or other security key material to gain access to the resource represented by the address, and metadata that instructs the source acquisition adapter to either perform the data acquisition in a particular manner, like providing a time interval for checking an RSS feed, or to perform forwarding of events in a particular manner, such as spacing events acquired from a current events news feed at least 60 seconds apart so that notification recipients get the chance to see each breaking news item on a constrained screen surface if that is the end-to-end experience to be constructed.

The source descriptions are held in one or multiple stores, such as the source database 138. The source descriptions may be partitioned across and within these stores along two different axes.

The first axis is a differentiation by the system tenant. System tenants or 'namespaces' are a mechanism to create isolated scopes for entities within a system. Illustrating a concrete case, if "Fred" is a user of a system implementing one embodiment, Fred will be able to create a tenant scope which provides Fred with an isolated, virtual environment that can hold source descriptions and configuration and state entirely independent of other sources 116 in the system. This axis may serve as a differentiation factor to spread source descriptions across stores, specifically also in cases where a tenant requires isolation of the stored metadata (which may include security sensitive data such as passwords), or for technical, regulatory or business reasons. A system tenant may also represent affinity to a particular datacenter in which the source description data is held and from where data acquisition is to be performed.

The second axis may be a differentiation by a numeric partition identifier chosen from a predefined identifier range. The partition identifier may be derived from invariants contained in the source description, such as for example, the source name and the tenant identifier. The partition identifier may be derived from these invariants using a hash function (one of many candidates is the Jenkins Hash, see http://www.burtleburtle.net/bob/hash/doobs.html) and the resulting hash value is computed down into the partition identifier range, possibly using a modulo function over the hash value. The identifier range is chosen to be larger (and can be substantially larger) than the largest number of storage partitions expected to be needed for storing all source descriptions to be ever held in the system.

Introducing storage partitions is commonly motivated by capacity limits, which are either immediately related to storage capacity quotas on the underlying data store or related to capacity limits affecting the acquisition engine 118 such as bandwidth constraints for a given datacenter or datacenter section, which may result in embodiments creating acquisition partitions 140 that are utilizing capacity across different datacenters or datacenter segments to satisfy the ingress bandwidth needs. A storage partition owns a subset of the overall identifier range and the association of a source description record with a storage partition (and the resources that access it) can be thus be directly inferred from its partition identifier.

Beyond providing a storage partitioning axis, the partition identifier is also used for scheduling or acquisition jobs and clearly defining the ownership relationship of an acquisition partition 140 to a given source description (which is potentially different from the relationship to the storage partition).

Ownership and Acquisition Partitions

Each source description in the system may be owned by a specific acquisition partition 140. Clear and unique ownership is used because the system does not acquire events from the exact same source 116 in multiple places in parallel as this may cause duplicate events to be emitted. To make this more concrete, one RSS feed defined within the scope of a tenant is owned by exactly one acquisition partition 140 in the system and within the partition there is one scheduled acquisition run on the particular feed at any given point in time.

An acquisition partition 140 gains ownership of a source description by way of gaining ownership of a partition identifier range. The identifier range may be assigned to the acquisition partition 140 using an external and specialized partitioning system that may have failover capabilities and can assign master/backup owners, or using a simpler mechanism where the partition identifier range is evenly spread across the number of distinct compute instances assuming the acquisition engine role. In a more sophisticated implementation with an external partitioning system, the elected master owner for a partition is responsible for seeding the scheduling of jobs if the system starts from a 'cold' state, meaning that the partition has not had a previous owner. In the simpler scenario, the compute instance owning the partition owns seeding the scheduling.

Scheduling

The scheduling needs for acquisition jobs depend on the nature of the concrete source, but there are generally two kinds of acquisition models that are realized in some described embodiments.

In a first model, the owner initiates some form of connection or long-running network request on the source's network service and waits for data to be returned on the connection in form of datagrams or a stream. In the case of a long-running request, commonly also referred to as long-polling, the source network service will hold on to the request until a timeout occurs or until data becomes available—in turn, the acquisition adapter will wait for the request to complete with or without a payload result and then reissue the request. As a result, this acquisition scheduling model has the form of a 'tight' loop that gets initiated as the owner of the source 116 learns about the source, and where a new request or connection is initiated immediately as the current connection or request completes or gets temporarily interrupted. As the owner is in immediate control of the tight loop, the loop can be reliably kept alive while the owner is running. If the owner stops and restarts, the loop also restarts. If the ownership changes, the loop stops and the new owner starts the loop.

In a second model, the source's network service does not support long-running requests or connections yielding data as it becomes available, but are regular request/response services that return immediately whenever queried. On such services, and this applies to many web resources, requesting data in a continuous tight loop causes an enormous amount of load on the source 116 and also causes significant network traffic that either merely indicates that the source 116 has not changed, or that, in the worst case, carries the same data over and over again. To balance the needs of timely event acquisition and not overload the source 116 with fruitless query traffic, the acquisition engine 118 will therefore execute requests in a 'timed' loop, where requests on the source 116 are executed periodically based on an interval that balances those considerations and also takes hints from the source 116 into account. The 'timed' loop gets initiated as the owner of the source 116 learns about the source.

There are two noteworthy implementation variants for the timed loop. The first variant is for low-scale, best-effort scenarios and uses a local, in-memory timer objects for scheduling, which cause the scale, control and restart characteristics to be similar to those of a tight loop. The loop gets initiated and immediately schedules a timer callback causing the first iteration of the acquisition job to run. As that job completes (even with an error) and it is determined that the loop shall continue executing, another timer callback is scheduled for the instant at which the job shall be executed next.

The second variant uses 'scheduled messages', which is a feature of several publish/subscribe systems, including Windows Azure™ Service Bus. The variant provides significantly higher acquisition scale at the cost of somewhat higher complexity. The scheduling loop gets initiated by the owner and a message is placed into the acquisition partition's scheduling queue. The message contains the source description. It is subsequently picked up by a worker which performs the acquisition job and then enqueues the resulting event into the target publish/subscribe system. Lastly, it also enqueues a new 'scheduled' message into the scheduling queue. That message is called 'scheduled' since it is marked with a time instant at which it becomes available for retrieval by any consumer on the scheduling queue.

In this model, an acquisition partition 140 can be scaled out by having one 'owner' role that primarily seeds scheduling and that can be paired with any number of 'worker' roles that perform the actual acquisition jobs.

Source Updates

As the system is running, the acquisition partitions 140 need to be able to learn about new sources 116 to observe and about which sources 116 shall no longer be observed. The decision about this typically lies with a user, except in the case of blacklisting a source 116 (as described below) due to a detected unrecoverable or temporary error, and is the result of an interaction with a management service 142. To communicate such changes, the acquisition system maintains a 'source update' topic in the underlying publish/subscribe infrastructure. Each acquisition partition 140 has a dedicated subscription on the topic with the subscription having a filter condition that constrains the eligible messages to those that carry a partition identifier within the acquisition partition's owned range. This enables the management service 142 to set updates about new or retired sources 116 and send them to the correct partition 140 without requiring knowledge of the partition ownership distribution.

The management service 142 submits update commands into the topic that contain the source description, the partition identifier (for the aforementioned filtering purpose), and an operation identifier which indicates whether the source 116 is to be added or whether the source 116 is removed from the system.

Once the acquisition partition 140 owner has retrieved a command message, it will either schedule a new acquisition loop for a new source 116 or it will interrupt and suspend or even retire the existing acquisition loop.

Blacklisting

Sources 116 for which the data acquisition fails may be temporarily or permanently blacklisted. A temporary blacklisting is performed when the source 116 network resource is unavailable or returns an error that is not immediately related to the issued acquisition request. The duration of a temporary blacklisting depends on the nature of the error. Temporary blacklisting is performed by interrupting the regular scheduling loop (tight or timed) and scheduling the next iteration of the loop (by ways of callback or scheduled message) for a time instant when the error condition is expected to be resolved by the other party.

Permanent blacklisting is performed when the error is determined to be an immediate result of the acquisition request, meaning that the request is causing an authentication or authorization error or the remote source 116 indicates some other request error. If a resource is permanently blacklisted, the source 116 is marked as blacklisted in the partition store and the acquisition loop is immediately aborted. Reinstating a permanently blacklisted source 116 requires removing the blacklist marker in the store, presumably along with configuration changes that cause a behavior change for the request, and restarting the acquisition loop via the source update topic.

Notification Distribution

Embodiments may be configured to distribute a copy of information from a given input event to each of a large number of 'targets 102' that are associated with a certain scope and do so in minimal time for each target 102. A target 102 may include an address of a device or application that is coupled to the identifier of an adapter to some 3rd party notification system or to some network accessible external infrastructure and auxiliary data to access that notification system or infrastructure.

Figure 4:
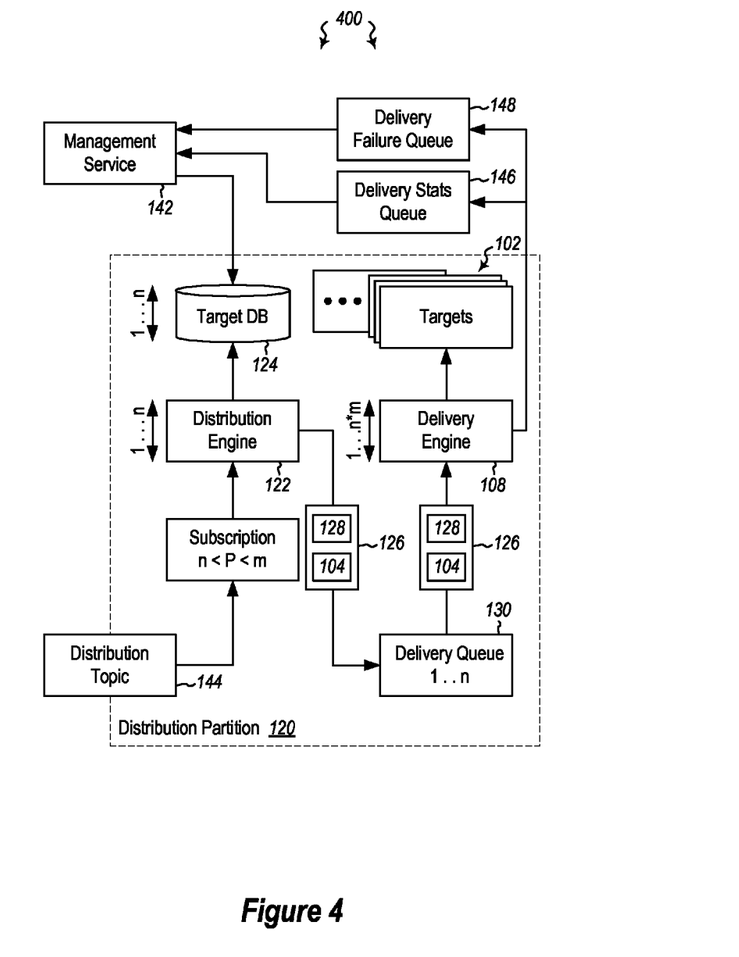
FIG. 4 illustrates an example of an event data distribution system.

Some embodiments may include an architecture that is split up into three distinct processing roles, which are described in the following in detail and can be understood by reference to FIG. 4. As noted in FIG. 4 by the '1', the ellipses, and 'n', each of the processing roles can have one or more instances of the processing role. Note that the use of 'n' in each case should be considered distinct from each other case as applied to the processing roles, meaning that each of the processing roles do not need to have the same number of instances. The 'distribution engine' 112 role accepts events and bundles them with routing slips (see e.g. routing slip 128-1 in FIG. 2) containing groups of targets 102. The 'delivery engine' 108 accepts these bundles and processes the routing slips for delivery to the network locations represented by the targets 102. The 'management role' illustrated by the management service 142 provides an external API to manage targets 102 and is also responsible for accepting statistics and error data from the delivery engine 108 and for processing/storing that data.

The data flow is anchored on a 'distribution topic 144' into which events are submitted for distribution. Submitted events are labeled, using a message property, with the scope they are associated with—which may be one of the aforementioned constraints that distinguish events and raw messages.

The distribution topic 144, in the illustrated example, has one passthrough (unfiltered) subscription per 'distribution partition 120'. A 'distribution partition' is an isolated set of resources that is responsible for distributing and delivering notifications to a subset of the targets 102 for a given scope. A copy of each event sent into the distribution topic is available to all concurrently configured distribution partitions at effectively the same time through their associated subscriptions, enabling parallelization of the distribution work.

Parallelization through partitioning helps to achieve timely distribution. To understand this, consider a scope with 10 million targets 102. If the targets' data was held in an unpartitioned store, the system would have to traverse a single, large database result set in sequence or, if the results sets were acquired using partitioning queries on the same store, the throughput for acquiring the target data would at least be throttled by the throughput ceiling of the given store's fronting network gateway infrastructure, as a result, the delivery latency of the delivery of notifications to targets 102 whose description records occur very late in the given result sets will likely be dissatisfactory.

If, instead, the 10 million targets 102 are distributed across 1,000 stores that each hold 10,000 target records and those stores are paired with dedicated compute infrastructure (distribution engine 122' and 'delivery engine 108' described herein) performing the queries and processing the results in form of partitions as described here, the acquisition of the target descriptions can be parallelized across a broad set of compute and network resources, significantly reducing the time difference for distribution of all events measured from the first to the last event distributed.

The actual number of distribution partitions is not technically limited. It can range from a single partition to any number of partitions greater than one.

In the illustrated example, once the 'distribution engine 122' for a distribution partition 120 acquires an event 104, it first computes the size of the event data and then computes the size of the routing slip 128, which may be calculated based on delta between the event size and the lesser of the allowable maximum message size of the underlying messaging system and an absolute size ceiling. Events are limited in size in such a way that there is some minimum headroom for 'routing slip' data.

The routing slip 128 is a list that contains target 102 descriptions. Routing slips are created by the distribution engine 122 by performing a lookup query matching the event's scope against the targets 102 held in the partition's store 124, returning all targets 102 matching the event's scope and a set of further conditions narrowing the selection based on filtering conditions on the event data. Embodiments may include amongst those filter conditions a time window condition that will limit the result to those targets 102 that are considered valid at the current instant, meaning that the current UTC time is within a start/end validity time window contained in the target description record. This facility is used for blacklisting, which is described later in this document. As the lookup result is traversed, the engine creates a copy of the event 104, fills the routing slip 128 up to the maximum size with target descriptions retrieved from the store 124, and then enqueues the resulting bundle of event and routing slip into the partition's 'delivery queue 130'.

The routing slip technique ensures that the event flow velocity of events from the distribution engine 122 to the delivery engine(s) 108 is higher than the actual message flow rate on the underlying infrastructure, meaning that, for example, if 30 target descriptions can be packed into a routing slip 128 alongside the event data, the flow velocity of event/target pairs is 30 times higher than if the event/target pairs were immediately grouped into messages.

The delivery engine 108 is the consumer of the event/routing-slip bundles 126 from the delivery queue 130. The role of the delivery engine 108 is to dequeue these bundles, and deliver the event 104 to all destinations listed in the routing slip 128. The delivery commonly happens through an adapter that formats the event message into a notification message understood by the respective target infrastructure. For example, the notification message may be delivered in a MPNS format for Windows® 7 phone, APN (Apple Push Notification) formats for iOS devices, C2DM (Cloud To Device Messaging) formats for Android devices, JSON (Java Script Object Notation) formats for browsers on devices, HTTP (Hyper Text Tranfer Protocol), etc The delivery engine 108 will commonly parallelize the delivery across independent targets 102 and serialize delivery to targets 102 that share a scope enforced by the target infrastructure. An example for the latter is that a particular adapter in the delivery engine may choose to send all events targeted at a particular target application on a particular notification platform through a single network connection.

The distribution and delivery engines 122 and 108 are decoupled using the delivery queue 130 to allow for independent scaling of the delivery engines 108 and to avoid having delivery slowdowns back up into and block the distribution query/packing stage.

Each distribution partition 120 may have any number of delivery engine instances that concurrently observe the delivery queue 130. The length of the delivery queue 130 can be used to determine how many delivery engines are concurrently active. If the queue length crosses a certain threshold, new delivery engine instances can be added to the partition 120 to increase the send throughput.

Distribution partitions 120 and the associated distribution and delivery engine instances can be scaled up in a virtually unlimited fashion in order to achieve optimal parallelization at high scale. If the target infrastructure is capable of receiving and forwarding one million event requests to devices in an in-parallel fashion, the described system is capable of distributing events across its delivery infrastructure—potentially leveraging network infrastructure and bandwidth across datacenters—in a way that it can saturate the target infrastructure with event submissions for a delivery to all desired targets 102 that is as timely as the target infrastructure will allow under load and given any granted delivery quotas.

As messages are delivered to the targets 102 via their respective infrastructure adapters, in some embodiments, the system takes note of a range of statistical information items. Amongst those are measured time periods for the duration between receiving the delivery bundle and delivery of any individual message and the duration of the actual send operation. Also part of the statistics information is an indicator on whether a delivery succeeded or failed. This information is collected inside the delivery engine 108 and rolled up into averages on a per-scope and on a per-target-application basis. The 'target application' is a grouping identifier introduced for the specific purpose of statistics rollup. The computed averages are sent into the delivery stats queue 146 in defined intervals. This queue is drained by a (set of) worker(s) in the management service 142, which submits the event data into a data warehouse for a range of purposes. These purposes may include, in addition to operational monitoring, billing of the tenant for which the events have been delivered and/or disclosure of the statistics to the tenant for their own billing of 3rd parties.

As delivery errors are detected, these errors are classified into temporary and permanent error conditions. Temporary error conditions may include, for example, network failures that do not permit the system to reach the target infrastructure's delivery point or the target infrastructure reporting that a delivery quota has been temporarily reached. Permanent error conditions may include, for example, authentication/authorization errors on the target infrastructure or other errors that cannot be healed without manual intervention and error conditions where the target infrastructure reports that the target is no longer available or willing to accept messages on a permanent basis. Once classified, the error report is submitted into the delivery failure queue 148. For temporary error conditions, the error may also include the absolute UTC timestamp until when the error condition is expected to be resolved. At the same time, the target is locally blacklisted by the target adapter for any further local deliveries by this delivery engine instance. The blacklist may also include the timestamp.

The delivery failure queue 148 is drained by a (set of) worker(s) in the management role. Permanent errors may cause the respective target to be immediately deleted from its respective distribution partition store 124 to which the management role has access. 'Deleting' may mean that the record is indeed removed or alternatively that the record is merely moved out of sight of the lookup queries by setting the 'end' timestamp of its validity period to the timestamp of the error. Temporary error conditions may cause the target to be deactivated for the period indicated by the error. Deactivation may be done by moving the start of the target's validity period up to the timestamp indicated in the error at which the error condition is expected to be healed.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
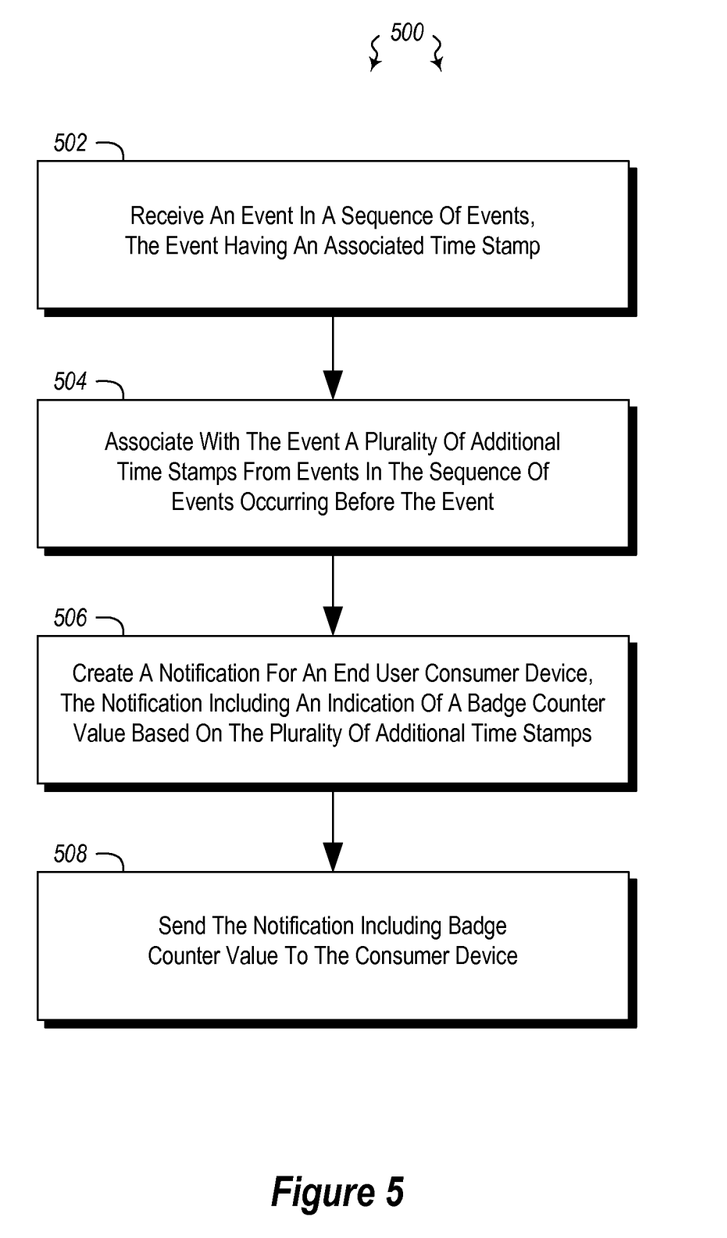
FIG. 5 illustrates a method of providing a badge counter.

Referring now to FIG. 5, a method 500 of providing a badge counter from a server to a consumer is illustrated. The badge counter indicates a number of notifications. The method 500 includes receiving an event in a sequence of events, the event having an associated time stamp (act 502). An example of this is illustrated in FIG. 1. For example, an event 104-3 may be associated with a time stamp T3. The method 500 further includes associating with the event a plurality of additional time stamps from events in the sequence of events occurring before the event (act 504). An example of this is illustrated in FIG. 1, which illustrates associating additional time stamps T1 and T2 with the event 104-2.

The method 500 further includes creating a notification for an end user consumer device, the notification including an indication of a badge counter value based on the plurality of additional time stamps (act 506). FIG. 1 illustrates a notification including the event 104 and the badge counter 106.

The method 500 further includes sending the notification including badge counter value to the consumer device (act 508). FIG. 1 illustrates the event 104 and the badge counter 106 are sent to the target 102-1.

Embodiments of the method 500 may be practiced where sending the notification including the badge counter includes sending a badge counter value that is limited by a maximum value. For example, the maximum value of a badge counter may be a platform dependant value constrained by a maximum badge counter value specified by a particular platform of an end user consumer device. For example, some platforms limit the size of the badge counter value to 99.

Embodiments of the method 500 may be practiced where the badge counter value is based on a reset time stamp caused by a consumer checking a notification stream. For example, a user may check notifications on a device, which causes a time stamp (such as time stamp 110) to be sent back to a server. The badge counter may be based on that reset time stamp, such as by only counting time stamps associated with the event occurring after the reset time stamp.

Alternatively or additionally, embodiments of the method 500 may be practiced where the badge counter value is based on a reset time stamp caused by a consumer opening an application. For example, a user opening an application associated with the badge counter may cause a time stamp to be sent back to a server from which time stamp further badge counter values are based.

Alternatively or additionally, embodiments of the method 500 may be practiced where the badge counter value is based on a time window specified by a user. For example, a user may specify a time window so as to be able to determine the number of events occurring within a particular timeframe.

Alternatively or additionally, embodiments of the method 500 may be practiced where the badge counter value is based on a total count of time stamps. In this example, the badge counter value represents a total all-time number of notifications within a particular stream.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of providing badge counters from a first system to a plurality of consumer devices in an event broadcast system without requiring individual tracking of counters for each consumer device, the badge counter indicating a number of notifications, the method comprising:
    receiving a first time stamp at the first system from an end user consumer device;
    identifying a first event to be sent to a plurality of different end users;
    at the first system, identifying a list of time stamps, the list of time stamps comprising a plurality of time stamps comprising time stamps associated with events in a plurality of events respectively, wherein each event is fanned out to a plurality of different end users at different end user consumer devices such that individual tracking of counters does not need to be performed at the first system for each of the end users and wherein the first event is included in the plurality of events;
    identifying time stamps in the plurality of time stamps that occur after the first time stamp;
    creating a notification for the end user consumer device, the notification including an indication of a badge counter value, the badge counter value being a number value based on the number of time stamps occurring after the first time stamp such that the first system is able to create a different badge counter for each different end user consumer device based on a received time stamp from an end user consumer device without individual tracking of badge counters for each end user consumer device; and
    sending the first event arid the notification, including the badge counter value, from the first system to the consumer device.

2. The method of claim 1, wherein sending the notification, including the badge counter value, comprises sending a badge counter value that is limited by a maximum value.

3. The method of claim 2, wherein the maximum value is a platform dependent value constrained by a maximum badge counter value specified by a particular platform of an end user consumer device.

4. The method of claim 2, wherein the maximum value is 99.

5. The method of claim 1, wherein the badge counter value is based on the first time stamp being a reset time stamp sent to the first system from the end user consumer device as a result of an end user checking a notification stream, such that the value of the badge counter indicates the number of all time stamps in the plurality of time stamps having a time stamp later than the reset time stamp.

6. The method of claim 1, wherein the badge counter value is based on the first time stamp being a reset time stamp sent to the first system from the end user consumer device as a result of an end user opening an application, such that the value of the badge counter indicates the number of all time stamps in the plurality of time stamps having a. time stamp later than the reset time stamp.

7. The method of claim 1, further comprising receiving a second time stamp from the end user consumer device, and wherein the badge counter value is based on a time window specified by a user by the first time stamp and the second time stamp such that the value of the badge counter indicates the number of time stamps having values occurring during the time window specified by the user.

8. The method of claim 1, further comprising sending a badge counter value including the total number of time stamps in the list of time stamps to provide an ail-time indication of a number of notifications.

9. A physical computer readable storage medium comprising computer executable instructions that when executed by one or more processors cause one or more processors to perform the following for a first system to provide badge counters to a plurality of consumer devices in an event broadcast system without requiring individual tracking of counters for each consumer device, the badge counter indicating a number of notifications:

receiving a first time stamp at the first system from an end user consumer device;

identifying a first even to be sent to a plurality of different end user;

at the first system, identifying a list of time stamps, the list of time stamps comprising a plurality of time stamps comprising time stamps associated with events in a plurality of events respectively, wherein each event is fanned out to a plurality of different end user at different end user consumer devices such that individual tracking of counters does not need to be performed at the first system for each of the end users and wherein the first event is included in the plurality of events;

identifying time stamps in the plurality of time stamps that occur after the first time stamp;

creating a notification for the end user consumer device, the notification including an indication of a badge counter value, the badge counter value being a number value based on the number of time stamps occurring after the first time stamp such that the first system is able to create a different badge counter for each different end user consumer device based on a received time stamp from an end user consumer device without individual tracking of badge counters for each end user consumer device; and sending the first event and the notification, including the badge counter value, from the first system to the consumer device.

10. The computer readable medium of claim 9, wherein sending the notification including the badge counter value comprises sending a badge counter value that is limited by a maximum value.

11. The computer readable medium of claim 10, wherein the maximum value is a platform dependent value constrained by a maximum badge counter value specified by a particular platform of an end user consumer device.

12. The computer readable medium of claim 10, wherein the maximum value is 99.

13. The computer readable medium of claim 9, wherein the badge counter value is based on the first time stamp being a reset time stamp sent to the first system from the end user consumer device as a result of an end user checking a notification stream, such that the value of the badge counter indicates the number of all time stamps in the plurality of time stamps having a time stamp later than the reset time stamp.

14. The computer readable medium of claim 9, wherein the badge counter value is based on the first time stamp being a reset time stamp sent to the first system from the end user consumer device as a result of an end user opening an application, such that the value of the badge counter indicates the number of time stamps in the plurality of time stamps having a time stamp later than the reset time stamp.

15. The computer readable medium of claim 9, further comprising receiving a second time stamp from the end user consumer device, and wherein the badge counter value is based on a time window specified by a user by the first time stamp and the second time stamp such that the value of the badge counter indicates the number of time stamps having values occurring during the time window specified by the user.

16. The computer readable medium of claim 9, further comprising sending a badge counter value including the total number of time stamps in the list of time stamps to provide an all-time indication of a number of notifications.

17. A computing system configured to provide badge counters from a first system to a plurality of consumer devices in an event broadcast system without requiring individual tracking of counters for each consumer device, the badge counter indicating a number of notifications, the computing system comprising:

one or more processors and one or more computer readable media implementing a delivery engine module, wherein the delivery engine module is configured to:

receive a first time stamp from an end user consumer device;

identify a first event to be sent to a plurality of different end users;

at the first system, identifying a list of time stamps, the list of time stamps comprising a plurality of time stamps comprising time stamps associated with events in a plurality of events respectively, wherein each event is fanned out to a plurality of different end users at different end user consumer devices such that individual tracking of counters does not need to be performed at the first system for each of the end users, and wherein the first event is included in the plurality of events;

identify time stamps in the plurality of time stamps that occur after the first time stamp;

create a notification for the end user consumer device, the notification including an indication of a badge counter value, the badge counter value being a number value based on the number of time stamps occurring after the first time stamp such that the first system is able to create a different badge counter for each different end user consumer device based on a received time stamp from an end user consumer device without individual tracking of badge counters for each end user consumer device; and send the first event and the notification including the badge counter value from the first system to the consumer device.

18. The computing system of claim 17, wherein sending the notification including the badge counter value comprises sending a badge counter value that is limited by a maximum value.

19. The computing system of claim 18, wherein the maximum value is a platform dependent value constrained by a maximum badge counter value specified by a particular platform of an end user consumer device.

20. The method of claim 1, wherein the acts are repeated a plurality of times with different time stamps send from different end user consumer devices to create and send a plurality of different notifications with different badge counter values for a plurality of different end users but where the same first event is associated with each of the different notifications and different badge counter values.

* * * * *